UNITED STATES PATENT OFFICE.

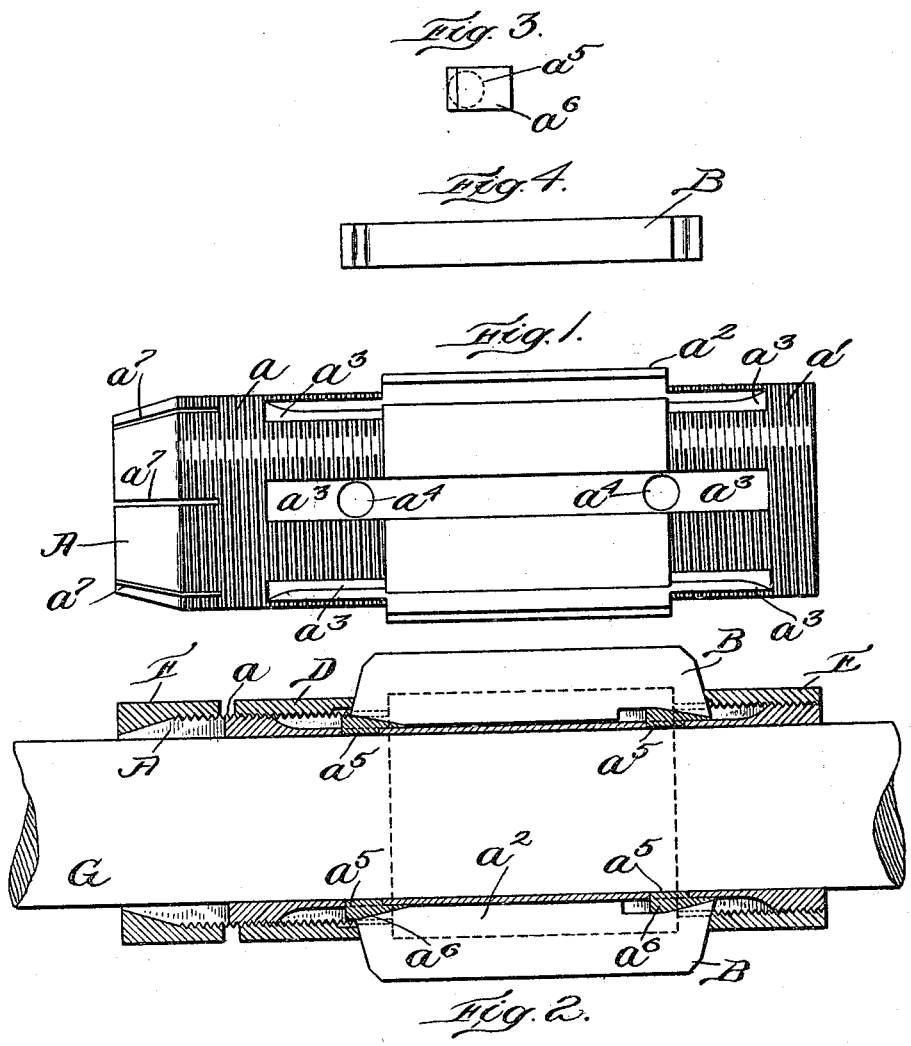

ALBERT A. MARTELL, OF MANSFIELD, MASSACHUSETTS.

REAMER.

1,193,583. Specification of Letters Patent. Patented Aug. 8, 1916.

Original application filed September 8, 1913, Serial No. 788,536. Divided and this application filed December 23, 1914. Serial No. 878,797.

*To all whom it may concern:*

Be it known that I, ALBERT A. MARTELL, of Mansfield, in the county of Bristol and State of Massachusetts, formerly of Boston, in said State, have invented a new and useful Reamer, of which the following is a specification, this application being a division of my application filed September 8, 1913, Serial No. 788,536.

The main object of my invention is to provide an improved reamer and especially to improve the form and mounting of the wedge members.

A feature of my invention consists in providing a blade having a relatively large movement radially of the shank during a relatively small movement along the shank.

Another feature consists in mounting the wedge members removably on the shank.

Another feature consists in making the engaging surfaces of the wedge members parallel to each other.

Another feature consists in the mounting of the wedge members of the shank.

Other features will be pointed out below.

In the drawings: Figure 1 is an elevation of the shank of the reamer embodying my invention; Fig. 2 is an elevation of my reamer, some parts being in section; Fig. 3 is a plan of one of the wedge members; and Fig. 4 is a plan of one of the blades.

The shank A of the reamer is threaded at $a$ and $a'$ and has the boss $a^2$ in which are a plurality of recesses $a^3$ to receive and hold the blades B. At the bottom of each recess $a^3$ are two holes $a^4$, $a^4$ to receive the circular projecting portion $a^5$ of wedge members $a^6$ which are mounted in the recesses $a^3$ so as to be removable transversely of the shank, swinging movement being prevented by the side walls of the slot and longitudinal movement by the engagement of portion $a^5$ in hole $a^4$. These wedge members give a very large movement of the blades away from the shank as compared with a very small movement along the shank and this is an important feature in my device and the removability of the wedge member provides an easy means of making sure that the wedge surface will always be accurate by substituting a new wedge as desired and in this way I do away with the necessity of truing the shank itself.

Each wedge member has a flat engaging face which is much more efficient than a curved engaging face particularly from the standpoint of stability and especially when in engagement with the flat engaging surface of my blades.

I arrange the engaging faces of the two wedge members for each blade parallel to each other, that is, they both slope outwardly in the same direction which makes it certain that even adjustment of the blades will be had particularly in evenly adjusting both ends of the blade.

Nuts D, E are interiorly threaded to engage threaded portions $a$, $a'$ and engage the blades to hold them in position. One end of the shank A is split at a plurality of points such as $a^7$, $a^7$ and the outer end of the shank is engaged by nut F so that when the nut is screwed to the right in Fig. 2 the shank will be clamped firmly against the shaft G.

What I claim is:

1. A reamer comprising a shank; a blade movably mounted on the shank; and wedge members connected to the shank for adjusting the blade with relation to the axis of the shank, the wedge members being of less length than the blade and adapted to give the blade a relatively large movement radially of the shank during a relatively small movement along the shank, said members being removable transversely of the shank but fixed to it during adjustment of the blade.

2. An expansible tool comprising a shank; a blade; and a member to adjust the blade, said member being removable from the shank but fixed to the latter during said adjustment.

3. A reamer comprising a shank; wedge members having parallel engaging surfaces and fixed to the shank during adjustment of the blade, but removable therefrom transversely thereof; and a blade mounted to engage said surfaces and to be adjusted thereby.

4. An expansible tool comprising a shank; a blade; and a wedge member having a flat engaging surface to adjust the blade, said member being removable transversely from the shank but fixed to the latter during said adjustment.

5. An expansible tool comprising a shank with a circular hole extending transversely of the shank; an adjusting member having a projection to enter said hole; means to prevent rotation of said adjusting member; and a blade to engage said adjusting member.

6. An expansible tool comprising a shank; a blade; and a plurality of members to adjust said blade, said members being removable transversely from the shank but fixed to it during adjustment of the blade.

7. An expansible tool comprising a shank; a blade; means to adjust said blade transversely of the shank and being itself removable from the shank but fixed thereto during said adjustment; and means which move said blade longitudinally and which also hold said blade and said adjusting means to the shank.

8. An expansible tool comprising a shank; a blade; a plurality of wedge members to adjust said blade transversely of the shank and being themselves removable from the shank but fixed thereto during said adjustment; and means which move said blade longitudinally and which also hold said blade and said wedges to the shank.

9. An expansible tool comprising a shank; a blade; means to adjust said blade transversely of the shank, said means being removable from the shank but fixed during said adjustment.

10. An expansible tool comprising a shank; a wedge member removable transversely from said shank but held by said shank against movement longitudinally of the shank; and a blade adapted to be adjusted by said wedge member.

11. An expansible tool comprising a shank with a recess; a wedge member comprising a wedge portion and a portion projecting from the wedge portion to enter transversely the said recess to prevent movement of said member longitudinally of the shank; and a blade adapted to be adjusted by said wedge member.

ALBERT A. MARTELL.

Witnesses:
ALEXANDER L. PELKEY,
GEORGE A. ROCKWELL.

Copies of this patent may be obtained for five cents each, by addressing the "Commissioner of Patents, Washington, D. C."